US012224090B2

(12) United States Patent
Takamura et al.

(10) Patent No.: US 12,224,090 B2
(45) Date of Patent: Feb. 11, 2025

(54) MULTILAYER VARISTOR

(71) Applicant: Panasonic Intellectual Property Management Co., Ltd., Osaka (JP)

(72) Inventors: Masashi Takamura, Hokkaido (JP); Sayaka Watanabe, Hokkaido (JP); Takeshi Fujii, Tokyo (JP); Ken Yanai, Hokkaido (JP); Yuto Akiyama, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 329 days.

(21) Appl. No.: 17/796,143

(22) PCT Filed: Dec. 17, 2021

(86) PCT No.: PCT/JP2021/046881
§ 371 (c)(1),
(2) Date: Jul. 28, 2022

(87) PCT Pub. No.: WO2022/138515
PCT Pub. Date: Jun. 30, 2022

(65) Prior Publication Data

US 2023/0079197 A1 Mar. 16, 2023

(30) Foreign Application Priority Data

Dec. 24, 2020 (JP) ................................ 2020-214486

(51) Int. Cl.
*H01C 7/105* (2006.01)
*H01C 1/148* (2006.01)

(52) U.S. Cl.
CPC ............ *H01C 7/105* (2013.01); *H01C 1/148* (2013.01)

(58) Field of Classification Search
CPC ................................ H01C 7/105; H01C 1/148
See application file for complete search history.

(56) References Cited

U.S. PATENT DOCUMENTS 5,793,601 A * 8/1998 Nakamura ............ H01F 1/0027 361/321.5
10,706,995 B1 * 7/2020 Uchida .................... H01C 7/12
(Continued)

FOREIGN PATENT DOCUMENTS

JP S59-069902 A 4/1984
JP H04-125902 A 4/1992
(Continued)

OTHER PUBLICATIONS

International Search Report dated Mar. 1, 2022 issued in International Patent Application No. PCT/JP2021/046881, with English translation.

*Primary Examiner* — Kyung S Lee
(74) *Attorney, Agent, or Firm* — Rimon P.C.

(57) ABSTRACT

A multilayer varistor has a stack structure including a plurality of layers stacked in a third direction. The multilayer varistor includes a first internal electrode electrically connected to a first external electrode, a second internal electrode electrically connected to the second external electrode, and a third internal electrode electrically connected to the third external electrode. The first internal electrode is disposed between the second internal electrode and the third internal electrode in the third direction.

20 Claims, 11 Drawing Sheets

(56) References Cited

U.S. PATENT DOCUMENTS

| | | | | |
|---|---|---|---|---|
| 2004/0233606 | A1* | 11/2004 | Inoue ....................... | H01C 7/12<br>361/118 |
| 2007/0091532 | A1* | 4/2007 | Yamauchi ................ | H01C 7/18<br>361/118 |
| 2020/0194150 | A1 | 6/2020 | Uchida | |

FOREIGN PATENT DOCUMENTS

| | | | |
|---|---|---|---|
| JP | H07-235406 | A | 9/1995 |
| JP | 2002-305103 | A | 10/2002 |
| JP | 2020-096075 | A | 6/2020 |

* cited by examiner

MULTILAYER VARISTOR

CROSS-REFERENCE OF RELATED APPLICATIONS

This application is the U.S. National Phase under 35 U.S.C. § 371 of International Patent Application No. PCT/JP2021/046881, filed on Dec. 17, 2021, which in turn claims the benefit of Japanese Application No. 2020-214486, filed on Dec. 24, 2020, the entire disclosures of which Applications are incorporated by reference herein.

TECHNICAL FIELD

The present invention relates to a multilayer varistor to be applied to various kinds of electronic devices.

BACKGROUND ART

As household appliances and in-vehicle electronic devices are recently downsized, varistors which are components of the household appliances and in-vehicle electronic devices are also required to be downsized. Moreover, since electrostatic capacitance influences the performance along with an increase in frequency, a varistor is required which has low electrostatic capacitance and which has small variation in the electrostatic capacitance while a prescribed varistor voltage is secured. When varistors are used in pairs, forming two varistors in a single element is proposed in order to reduce the difference of electrostatic capacitance between the pairs. Note that Patent Literature 1 is known as an example of information on prior art documents relating to the invention of the present application.

In a conventional multilayer varistor, however, stray capacitance is produced not only between internal electrodes which provide varistor performance but also between two external electrodes. Thus, crosstalk occurs that a signal leaks from one of the two external electrodes to the other of the two external electrodes, which may disturb a signal waveform.

CITATION LIST

Patent Literature

Patent Literature 1: JP H 07-235406 A

SUMMARY OF INVENTION

A multilayer varistor of an aspect of the present disclosure includes a sintered body, a first external electrode, a second external electrode, a third external electrode, a first internal electrode, a second internal electrode, and a third internal electrode. The sintered body has a first end surface and a second end surface facing each other in a first direction, a first side surface and a second side surface facing each other in a second direction, and a first principal surface and a second principal surface facing each other in a third direction. The sintered body has a stack structure including a plurality of layers stacked in the third direction and is in a shape of a rectangular parallelepiped having long sides extending in the first direction. The first external electrode is disposed on at least one of the first side surface or the second side surface. The second external electrode and the third external electrode are disposed on the at least one of the first side surface or the second side surface and are on opposing sides of the first external electrode. The first internal electrode is disposed in an interior of the sintered body and is electrically connected to the first external electrode. The second internal electrode is disposed in the interior of the sintered body and is electrically connected to the second external electrode. The third internal electrode is disposed in the interior of the sintered body and is electrically connected to the third external electrode. The first internal electrode is disposed between the second internal electrode and the third internal electrode in the third direction.

DESCRIPTION OF EMBODIMENTS

(1) First Embodiment

A multilayer varistor of a first embodiment of the present disclosure will be described below with reference to the drawings.

Figure 1:
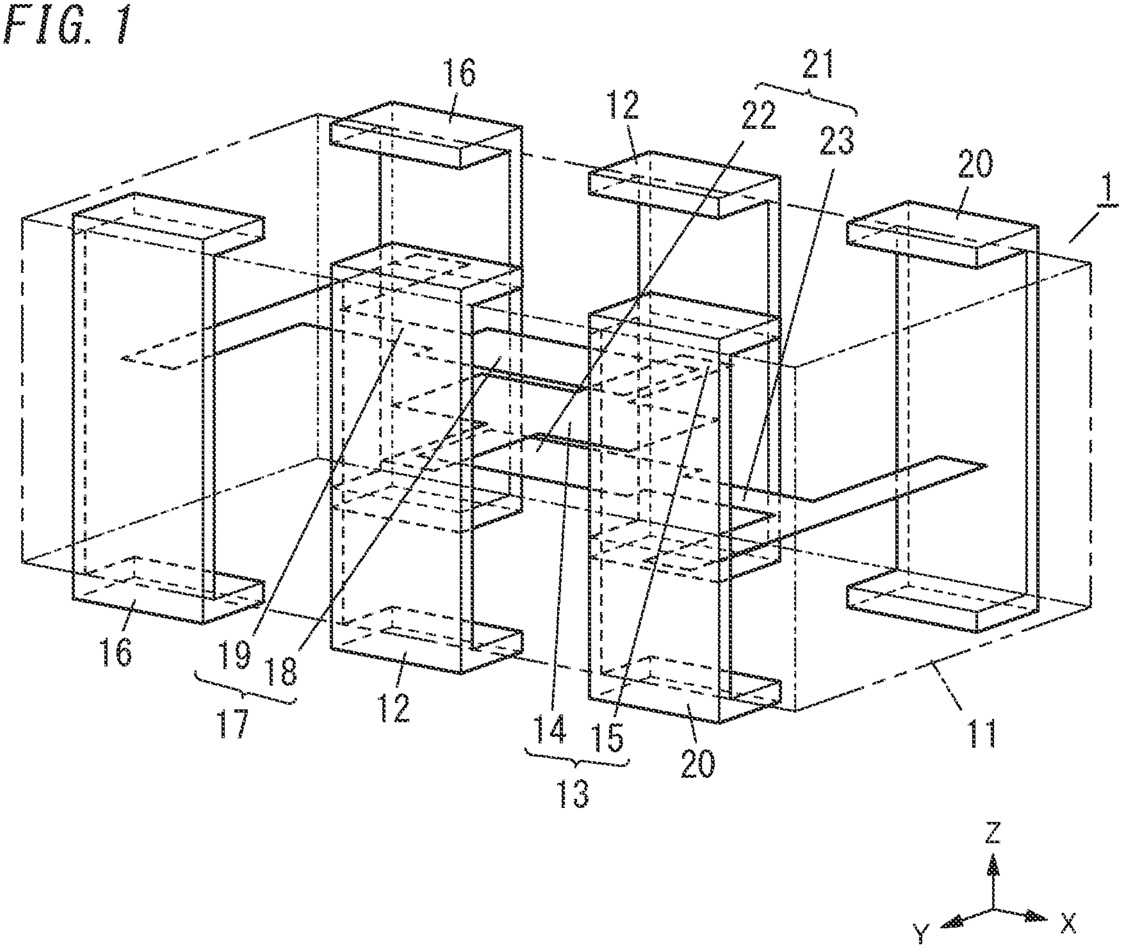
FIG. 1 is a transparent perspective view of a multilayer varistor of a first embodiment of the present disclosure.
Figure 2:
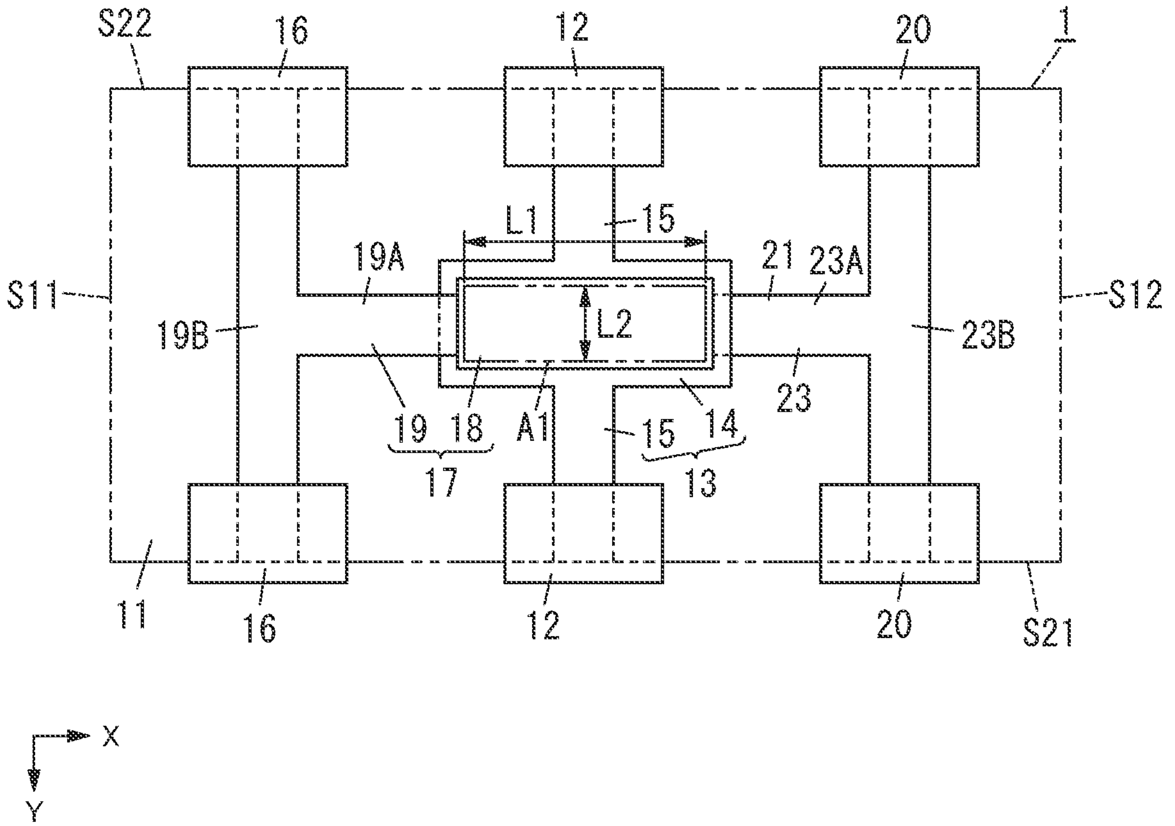
FIG. 2 is a transparent top view of the multilayer varistor of the first embodiment of the present disclosure.
Figure 3:
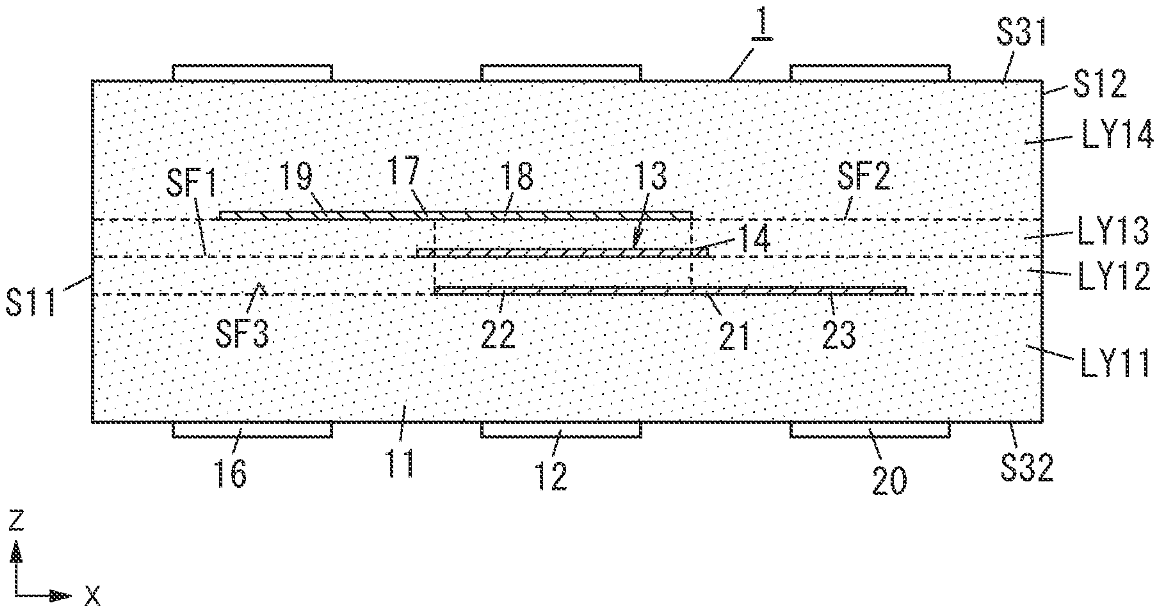
FIG. 3 is a sectional view of the multilayer varistor of the first embodiment of the present disclosure.
Figure 4:
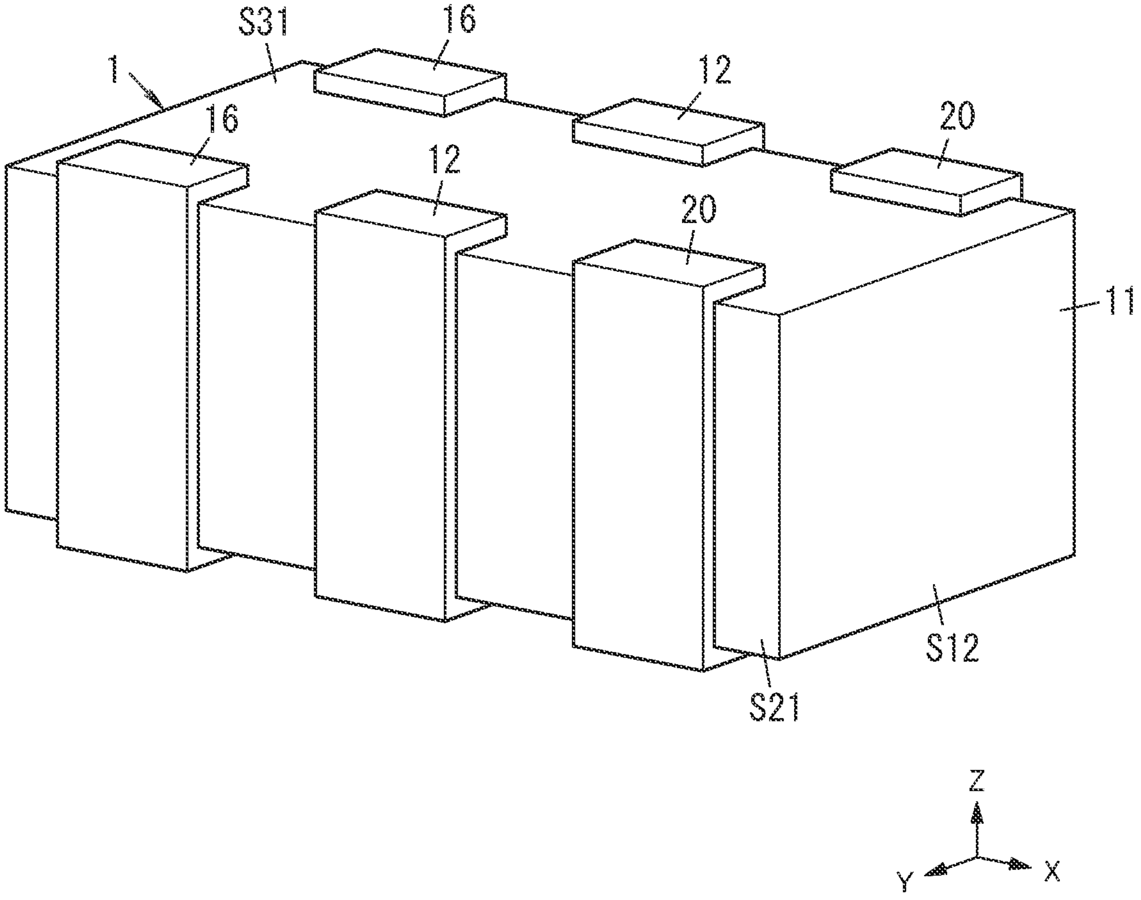
FIG. 4 is an exterior perspective view of the multilayer varistor of the first embodiment of the present disclosure.

FIG. 1 is a transparent perspective view of a multilayer varistor 1 of the first embodiment. FIG. 2 is a transparent top view of the multilayer varistor 1. FIG. 3 is a sectional view of the multilayer varistor 1. The multilayer varistor 1 includes a sintered body 11, first external electrodes 12, second external electrodes 16, third external electrodes 20, a first internal electrode 13, a second internal electrode 17, and a third internal electrode 21. The sintered body 11, except for the external electrodes of the multilayer varistor 1, is in the shape of a rectangular parallelepiped, for example, having a length of 1.6 mm, a width of 0.8 mm, and a height of 0.8 mm Note that in the exterior perspective views such as FIG. 3, the outer shape of the sintered body 11 is shown in the form of a rectangular parallelepiped, but corners of the sintered body 11 may accordingly be beveled, or the corners of the sintered body 11 may be rounded.

In the following description, as shown in FIG. 1, an X-axis direction parallel to the long side direction of the sintered body 11 is defined as a left/right direction, a Y-axis direction is defined as a forward/backward direction (depth direction), a Z-axis direction is defined as an up/down direction. Moreover, a positive direction of the X axis is defined as a right side, a positive direction of the Y axis is defined as a forward side, and a positive direction of the Z axis is defined as an upper side. However, these directions are only examples and should not be construed as limiting the directions of the multilayer varistor 1 in use. In addition, the arrows indicating the respective directions on the drawings are just shown there as an assistant to description and are insubstantial ones.

As shown in FIGS. 2 and 3, the sintered body 11 has a first end surface S11 and a second end surface S12 facing each other in a first direction, a first side surface S21 and a second side surface S22 facing each other in a second direction, and a first principal surface S31 and a second principal surface S32 facing each other in a third direction. The sintered body 11 has a stack structure including a plurality of layers LY11 to LY14 (see FIG. 3) stacked in the third direction and is in the shape of a rectangular parallelepiped having long sides extending in the first direction.

The sintered body 11 includes a semiconductor ceramic component having a non-linearity resistance characteristic. The sintered body 11, for example, includes ZnO as a main component, may include at least one selected from the group consisting of $Bi_2O_3$, $Co_2O_3$, $MnO_2$, and $Sb_2O_3$ as an accessory component, and may include at least one selected from the group consisting of $Pr_6O_{11}$, $Co_2O_3$, $CaCO_3$, and $Cr_2O_3$. In the sintered body 11, ZnO is sintered, and the other accessory components are deposited on the grain boundary of ZnO particles, and internal electrodes are formed between the stacked layers. A grain boundary barrier formed between ZnO particles expresses a non-linearity resistance characteristic. The sintered body 11 is formed, for example, by stacking the four layers LY11 to LY14 (see FIG. 3) including ZnO as a main component on one another and then sintering the four layers LY11 to LY14.

The first external electrodes 12 are disposed at center parts of long-side side surfaces of the sintered body 11. The first external electrodes 12 are electrically connected to the first internal electrode 13. In the present embodiment, the sintered body 11 is provided with two first external electrodes 12, and one of the two first external electrodes 12 is disposed on the first side surface S21, and the other of the two first external electrodes 12 is disposed on the second side surface S22. The two first external electrodes 12 are electrically connected to each other via the first internal electrode 13.

The second external electrodes 16 and the third external electrodes 20 are disposed on opposing sides of the first external electrodes 12. In the present embodiment, the second external electrode 16 and the third external electrode 20 are disposed on opposing sides of each of the two first external electrodes 12. That is, on the first side surface S21, the second external electrode 16 and the third external electrode 20 are disposed on the opposing sides of the first external electrode 12, and on the second side surface S22, the second external electrode 16 and the third external electrode 20 are disposed on the opposing sides of the first external electrode 12. In other words, the sintered body 11 is provided with two second external electrodes 16, and one of the two second external electrodes 16 is disposed on the first side surface S21, and the other of the two second external electrodes 16 is disposed on the second side surface S22. Similarly, the sintered body 11 is provided with two third external electrodes 20, and one of the two third external electrodes 20 is disposed on the first side surface S21, and the other of the two third external electrodes 20 is disposed on the second side surface S22.

The second internal electrode 17 electrically connected to the second external electrodes 16 and the third internal electrode 21 electrically connected to the third external electrodes 20 are disposed in the interior of the sintered body 11. The second external electrodes 16 are electrically connected to the second internal electrode 17, and the third external electrodes 20 are electrically connected to the third internal electrode 21. That is, the two second external electrodes 16 provided to the sintered body 11 are electrically connected to each other via the second internal electrode 17, and the two third external electrodes 20 provided to the sintered body 11 are electrically connected to each other via the third internal electrode 21.

In the present embodiment, the sintered body 11 includes, for example, the four layers LY11 to LY14 stacked on one another in the third direction (see FIG. 3). The first internal electrode 13 is provided by being printed onto, for example, an upper surface (hereinafter also referred to as a first stacking surface SF1) of the layer LY12 of the four layers LY11 to LY14. The second internal electrode 17 is provided by being printed onto, for example, an upper surface (hereinafter also referred to as a second stacking surface SF2) of the layer LY13 stacked on the layer LY12. The third internal electrode 21 is provided by being printed onto, for example, an upper surface (hereinafter also referred to as a third stacking surface SF3) of the layer LY11 stacked under the layer LY12. In other words, the first internal electrode 13 is disposed on the first stacking surface SF1 in the interior of the sintered body 11. The second internal electrode 17 is disposed on the second stacking surface SF2, which is different from the first stacking surface SF1, in the interior of the sintered body 11. The third internal electrode 21 is disposed on the third stacking surface SF3, which is different from the first stacking surface SF1 and the second stacking surface SF2, in the interior of the sintered body 11. Thus, in the third direction (up/down direction), the first internal electrode 13 is disposed between the second internal electrode 17 and the third internal electrode 21.

The first internal electrode 13 includes a first facing part 14 and first lead-out parts 15. The width of each of the first lead-out parts 15 is less than the width of the first facing part 14. The first lead-out parts 15 protrude from the first facing part 14 along the second direction. In the present embodiment, two first lead-out parts 15 protrude forward and backward from the first facing part 14. One of the two first lead-out parts 15 is electrically connected to the first external electrode 12 disposed on the first side surface S21, and the other of the two first lead-out parts 15 is electrically connected to the first external electrode 12 disposed on the second side surface S22.

The second internal electrode 17 includes a second facing part 18 and a second lead-out part 19. The width of the second lead-out part 19 is less than the width of the second facing part 18. The second lead-out part 19 protrudes from the second facing part 18 along the first direction. In the present embodiment, the second lead-out part 19 includes a first connection part 19B connecting the two second external electrodes 16 to each other and a first projection 19A protruding from the second facing part 18 along the first direction and connected to the first connection part 19B as shown in FIG. 2. Here, the first projection 19A protrudes, for example, leftward from the second facing part 18. The first connection part 19B protrudes forward and backward from a left end of the first projection 19A to connect the two second external electrodes 16 to each other.

The third internal electrode 21 includes a third facing part 22 and a third lead-out part 23. The width of the third lead-out part 23 is less than the width of the third facing part 22. The third lead-out part 23 protrudes from the third facing part 22 along the first direction. In the present embodiment, the third lead-out part 23 protrudes in a direction away from the second lead-out part 19, for example, rightward. As shown in FIG. 2, the third lead-out part 23 includes a second connection part 23B connecting the two third external electrodes 20 to each other and a second projection 23A protruding from the third facing part 22 along the first direction and connected to the second connection part 23B. Here, the second projection 23A protrudes, for example, rightward from the third facing part 22. The second connection part 23B protrudes forward and backward from a right end of the second projection 23A to connect the two third external electrodes 20 to each other.

Here, the first internal electrode 13 is disposed on the first stacking surface SF1, the second internal electrode 17 is disposed on the second stacking surface SF2, and the third internal electrode 21 is disposed on the third stacking surface SF3, and the first internal electrode 13, the second internal electrode 17, and the third internal electrode 21 are each disposed along the second direction.

In this embodiment, the length of the first facing part 14 is greater than the length of each of the second facing part 18 and the third facing part 22 in the first direction. Moreover, the length of the first facing part 14 is greater than the length of each of the second facing part 18 and the third facing part 22 in the second direction. Thus, the area of the first facing part 14 is larger than the area of each of the second facing part 18 and the third facing part 22. The first facing part 14 having such a dimension is disposed between the second facing part 18 and the third facing part 22, and therefore, stray capacitance generated between the second facing part 18 and the third facing part 22 is reduced, thereby suppressing the crosstalk.

As described above, in the present embodiment, the two first external electrodes 12, the two second external electrodes 16, and the two third external electrodes 20 are provided on both side surfaces (the first side surface S21 and the second side surface S22) which are long sides when the sintered body 11 is viewed in a stack direction. In the first direction, each of the first external electrodes 12 is disposed between the second external electrode 16 and the third external electrode 20 and can thus reduce the stray capacitance between the second external electrode 16 and the third external electrode 20. Moreover, the two first external electrodes 12 are connected to each other via the first lead-out parts 15, the two second external electrodes 16 are connected to each other via the second lead-out part 19, and the two third external electrodes 20 are connected to each other via the third lead-out part 23. This configuration enables the first external electrodes 12, the second external electrodes 16, and the third external electrodes 20 to be simultaneously formed, and therefore, steps of forming these electrodes are simplified and these electrodes can be stably formed in shape, so that, multilayer varistors 1 with reduced variations in their characteristics are obtained.

Moreover, the first internal electrode 13 is disposed between the second internal electrode 17 and the third internal electrode 21 in the stack direction of the sintered body 11. That is, the first internal electrode 13 is disposed between the second internal electrode 17 and the third internal electrode 21 in the third direction. Specifically, the first facing part 14 is disposed between the second internal electrode 17 and the third internal electrode 21. In other words, the second facing part 18 and the third facing part 22 face each other, and the first internal electrode 13 is disposed between the second facing part 18 and the third facing part 22. Thus, the first facing part 14 is disposed between the second facing part 18 and the third facing part 22. The second facing part 18 faces the first facing part 14, and the first facing part 14 faces the third facing part 22, thereby forming a varistor region.

Figure 5:
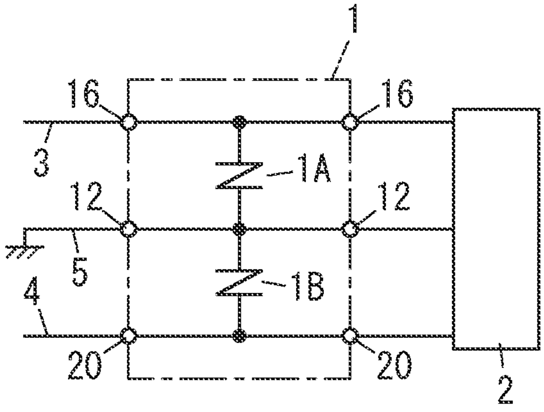
FIG. 5 is a circuit diagram of a usage example of the multilayer varistor of the first embodiment of the present disclosure.

FIG. 5 is a schematic circuit diagram of a usage example of the multilayer varistor 1 of the present embodiment. The multilayer varistor 1 of the present embodiment includes: a first varistor 1A formed among the first external electrodes 12 and the second external electrodes 16; and a second varistor 1B formed among the first external electrodes 12 and the third external electrodes 20. The circuit diagram in FIG. 5 shows the multilayer varistor 1 disposed in the vicinity of a communication IC 2 configured to perform communication based on a two-wire differential voltage transmission scheme. To the communication IC 2, lands of signal lines 3 and 4 and a land of a ground line 5 are connected. The first external electrodes 12, which are in a pair and are disposed on the first side surface S21 and the second side surface S22, are connected to the land of the ground line 5, and the second external electrodes 16, which are in a pair and are disposed on the first side surface S21 and the second side surface S22, are connected to the land of the signal line 3, and the third external electrodes 20, which are in a pair and are disposed on the first side surface S21 and the second side surface S22, are connected to the land of the signal line 4. In such a circuit, for example, when static electricity is superposed on the signal line 3 and a voltage higher than a prescribed threshold voltage is thus applied to the first varistor 1A, the electric resistance of the first varistor 1A rapidly decreases, and a current flows through the first varistor 1A, and thereby, the communication IC 2 is protected. Note that the circuit shown in FIG. 5 is a mere example of a circuit to which the multilayer varistor 1 is to be applied, and thus, the circuit may accordingly be modified.

In the multilayer varistor 1 of the present embodiment, the first facing part 14 is, for example, in the shape of a rectangle of sides 0.46 mm×0.20 mm, and the second facing part 18 and the third facing part 22 are each, for example, in the shape of a rectangle of sides 0.40 mm×0.14 mm. Moreover, the first facing part 14 and the second facing part 18 face each other with a distance of, for example, 0.035 mm provided therebetween. Similarly, the first facing part 14 and the third facing part 22 face each other with a distance of, for example, 0.035 mm provided therebetween. Here, centers of the first, second, and third facing parts are at the same location when viewed in the stack direction. That is, when viewed in the stack direction, the first facing part 14 extends beyond the second facing part 18 and the third facing part 22 by 0.03 mm and entirely covers the peripheral edges of the second facing part 18 and the third facing part 22. In other words, when viewed in the third direction, the first facing part 14 covers the outer perimeters of the second facing part 18 and the third facing part 22. This prevents the stray capacitance from being generated between the second facing part 18 and the third facing part 22, thereby suppressing the crosstalk. Note that the dimensions described above are mere examples and may accordingly be modified.

The second lead-out part 19 having a width of, for example, 0.1 mm extends from the second facing part 18 and is connected to the second external electrodes 16. Similarly, the third lead-out part 23 having a width of, for example, 0.1 mm extends from the third facing part 22 and is connected to the third external electrodes 20. Moreover, the first lead-out part 15 having a width of, for example, 0.1 mm extends from the first facing part 14 and is connected to the first external electrodes 12. As described above, the internal electrodes are connected via the lead-out parts having smaller widths than the facing parts to the external electrodes, and therefore, the stray capacitance between each second external electrode 16 and each third external electrode 20 can be reduced, thereby minimizing the influence on the crosstalk.

Here, in the second direction, the width of the second lead-out part 19 is desirably less than or equal to 90% of the width of the second facing part 18. Further, in the second direction, the width of the second lead-out part 19 is more desirably less than or equal to 70% of the width of the second facing part 18. Similarly, in the second direction, the width of the third lead-out part 23 is desirably less than or equal to 90% of the width of the third facing part 22. Further, in the second direction, the width of the second lead-out part 19 is more desirably less than or equal to 70% of the width of the second facing part 18. Conversely, if the width of the second lead-out part 19 and the width of the third lead-out part 23 are respectively greater than 90% of the width of the second facing part 18 and the width of the third facing part 22, the stray capacitance which influences on the crosstalk increases, and thus, such widths are undesirable. Moreover, the width of the second lead-out part 19 being less than or equal to 90% of the width of the second facing part 18 in the second direction reduces the stray capacitance generated in the first varistor 1A, thereby suppressing the crosstalk from occurring. Further, the width of the third lead-out part 23 being less than or equal to 90% of the width of the third facing part 22 in the second direction reduces the stray capacitance generated in the second varistor 1B, thereby suppressing the crosstalk from occurring. Furthermore, reducing the absolute value of a difference between the stray capacitance of the first varistor 1A and the stray capacitance of the second varistor 1B suppresses the crosstalk.

Moreover, in the second direction, the width of the second lead-out part 19 is desirably greater than or equal to 0.08 mm, and more desirably greater than or equal to 0.1 mm. Similarly, in the second direction, the width of the third lead-out part 23 is desirably greater than or equal to 0.08 mm, and more desirably greater than or equal to 0.1 mm. If the width of each of the second lead-out part 19 and the third lead-out part 23 is less than 0.08 mm, the shape of each of the second lead-out part 19 and the third lead-out part 23 tends to become unstable, and thus, connection of the second lead-out part 19 to the second external electrodes 16 and connection of the third lead-out part 23 to the third external electrodes 20 tend to become unstable. The second lead-out part 19 and the third lead-out part 23 each having a width of greater than or equal to 0.08 mm provide the advantage that the shape of each of the second lead-out part 19 and the third lead-out part 23 is easily maintained.

Moreover, in the first direction, the width of the first lead-out part 15 is desirably less than or equal to 90% of the width of the first facing part 14. Further, in the first direction, the width of each first lead-out part 15 is more desirably less than or equal to 70% of the width of the first facing part 14. The width of each first lead-out part 15 being less than or equal to 90% of the width of the first facing part 14 in the first direction reduces the stray capacitance, thereby suppressing the crosstalk from occurring. Moreover, in the first direction, the width of each first lead-out part 15 is desirably greater than or equal to 0.08 mm, and more desirably greater than or equal to 0.1 mm. This provides the advantage that the shape of each first lead-out part 15 is easily maintained.

Moreover, when viewed from above, in the first direction, a size by which the first facing part 14 extends beyond the outer perimeters of the second facing part 18 and the third facing part 22 is desirably greater than or equal to 7.5% and less than or equal to 15% of the long side of each of the second facing part 18 and the third facing part 22. In other words, in the first direction, the length of the first facing part 14 is preferably greater than or equal to 107.5% and less than or equal to 115% of the length of the second facing part 18 or the third facing part 22. This is because if the amount of protrusion of the first facing part 14 is less than 7.5% of the long side of each of the second facing part 18 and the third facing part 22, the crosstalk rapidly increases, and if the amount of protrusion is greater than 15% of the long side, misalignment in manufacturing cannot be lessened, which leads to a large capacity difference between the first varistor 1A and the second varistor 1B. Note that the length of the first facing part 14 in the first direction is more preferably greater than or equal to 9% and less than or equal to 13.5% of the length of the second facing part 18 or the third facing part 22, and in this case, the crosstalk can be further reduced, and the misalignment in manufacturing can be lessened.

Note that in the second direction, the length of the first facing part 14 is preferably greater than or equal to 107.5% and less than or equal to 115% of the length of the second facing part 18 or the third facing part 22. This is because if the amount of protrusion of the first facing part 14 is less than 7.5% of the long side of each of the second facing part 18 and the third facing part 22, the crosstalk rapidly increases, and if the amount of protrusion is greater than 15% of the long side, misalignment in manufacturing cannot be lessened, which leads to a large capacity difference between the first varistor 1A and the second varistor 1B.

Moreover, in the sintered body 11, the volume of a region between the first facing part 14 and the second facing part 18 is preferably less than or equal to 5%, and desirably less than or equal to 1% of the total volume of the sintered body 11. This is because if the volume is greater than 1%, the entirety of the varistor region is in the proximity of the external electrode, which increases capacitance which influences the crosstalk.

Moreover, the area of the first facing part 14 is preferably greater than the area of the second facing part 18 or the third facing part 22. In the present embodiment, the first, second, and third internal electrodes 13, 17, and 21 are formed such that the area of the first facing part 14 is greater than the area of the second facing part 18 and greater than the area of the third facing part 22.

Incidentally, the first facing part 14 of the first internal electrode 13 is disposed to overlap the second facing part 18 of the second internal electrode 17 and the third facing part 22 of the third internal electrode 21 in the third direction in the interior of the sintered body 11. That is, the first internal electrode 13 has a superposition region A1 (see FIG. 2) superposed on the second internal electrode 17 and the third internal electrode 21 in the third direction.

The superposition region A1 is a rectangular region whose longitudinal direction extending in the first direction. The length L1 of the superposition region A1 in the first direction is greater than the length L2 of the superposition region A1 in the second direction. The length L1 in the first direction being greater than the length L2 in the second direction reduces the stray capacitance generated between the second facing part 18 and the third facing part 22 disposed with the first facing part 14 being sandwiched therebetween, thereby suppressing the crosstalk.

Moreover, the multilayer varistor 1 of the present embodiment includes the first varistor 1A and the second varistor 1B, where the electrostatic capacitance of the first varistor 1A and the electrostatic capacitance of the second varistor 1B are each preferably less than or equal to 200 pF.

Moreover, the difference between the electrostatic capacitance of the first varistor 1A and the electrostatic capacitance of the second varistor 1B is preferably greater than or equal to −20% and less than or equal to +20% of the electrostatic capacitance of the first varistor 1A. This can suppress the cross talk when the multilayer varistor 1 is connected to the communication IC 2 as shown in FIG. 5, thereby improving the quality of communication.

(2) Second Embodiment

A multilayer varistor 1 of a second embodiment will be described below with reference to FIGS. 6 and 7.

Figure 6:
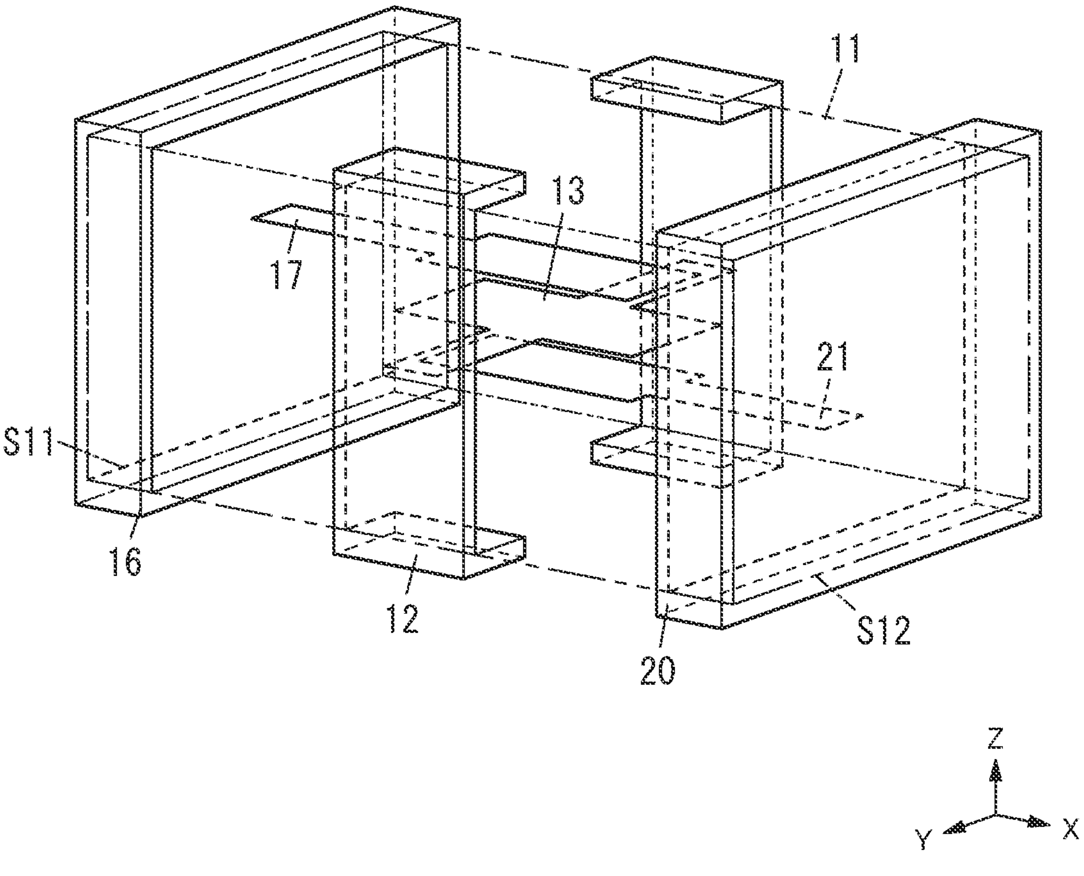
FIG. 6 is a transparent perspective view of a multilayer varistor of a second embodiment of the present disclosure.
Figure 7:
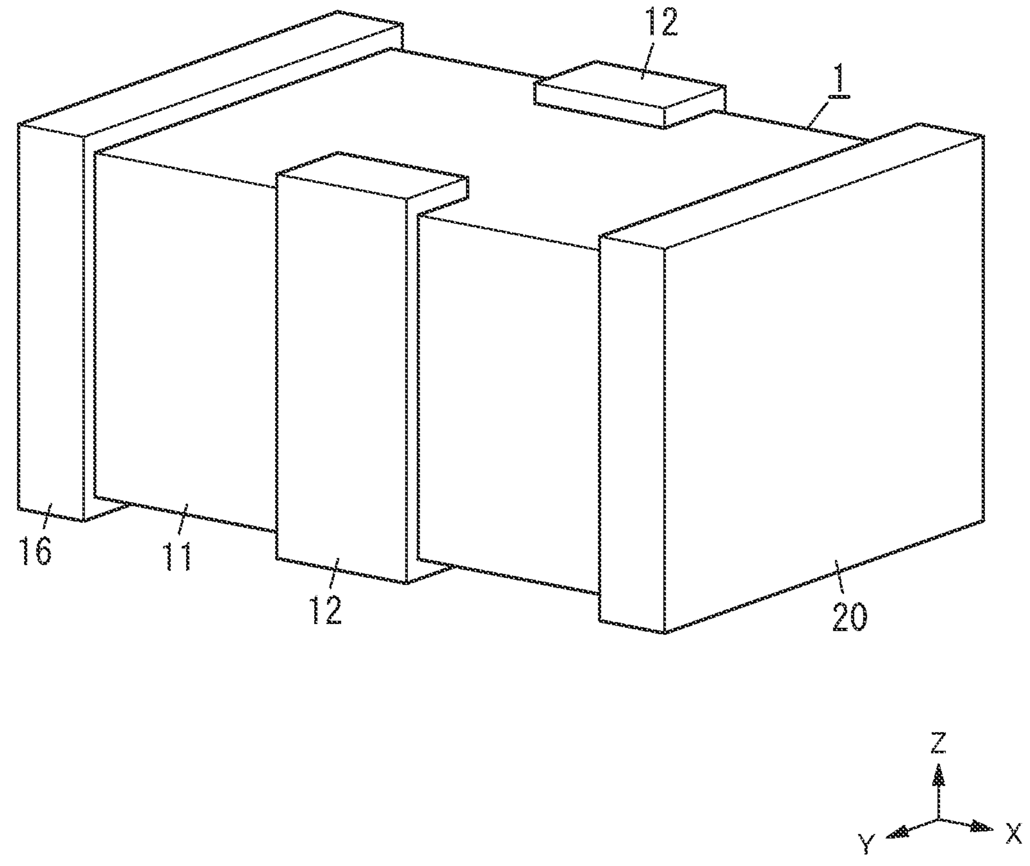
FIG. 7 is an exterior perspective view of the multilayer varistor of the second embodiment of the present disclosure.

FIG. 6 is a transparent perspective view of the multilayer varistor 1 of the second embodiment. FIG. 7 is an exterior perspective view of the multilayer varistor 1 of the second embodiment.

In the multilayer varistor 1 of the first embodiment, the second external electrodes 16 and the third external electrodes 20 are provided on both the side surfaces serving as long sides, whereas in the multilayer varistor 1 of the second embodiment, a second external electrode 16 is provided on a first end surface S11 of a sintered body 11, and a third external electrode 20 is provided on a second end surface S12 of the sintered body 11. Note that configurations of a first internal electrode 13, a second internal electrode 17, and a third internal electrode 21 are similar to those in the first embodiment, and therefore, common components are denoted by the same reference signs, and the description thereof is omitted.

In the multilayer varistor 1 of the second embodiment, first external electrodes 12 are disposed on part of a first side surface S21 and part of a second side surface S22.

The second external electrode 16 is disposed at least part of the first end surface S11. In the present embodiment, the second external electrode 16 is disposed on the entirety of the first end surface S11 and extends from the first end surface S11 to part of each of the first side surface S21, the second side surface S22, a first principal surface S31, and a second principal surface S32.

Moreover, the third external electrode 20 is disposed at least part of the second end surface S12. In the present embodiment, the third external electrode 20 is disposed on the entirety of the second end surface S12 and extends from the second end surface S12 to part of each of the first side surface S21, and the second side surface S22, the first principal surface S31, and the second principal surface S32.

Note that in the multilayer varistor 1 of the second embodiment, the second external electrode 16 extends from the first end surface S11 to the part of each of the first side surface S21, the second side surface S22, the first principal surface S31, and the second principal surface S32, and therefore, the distance between the second external electrode 16 and each of the first external electrodes 12 can be larger than that in the multilayer varistor 1 of the first embodiment, thereby reducing stray capacitance between the second external electrode 16 and each of the first external electrodes 12.

Moreover, in the multilayer varistor 1 of the second embodiment, the third external electrode 20 extends from the second end surface S12 to the part of each of the first side surface S21, the second side surface S22, the first principal surface S31, and the second principal surface S32, and therefore, the distance between the third external electrode 20 and each of the first external electrodes 12 can be larger than that in the multilayer varistor 1 of the first embodiment, thereby reducing stray capacitance between the third external electrode 20 and each of the first external electrodes 12.

Moreover, the second external electrode 16 is disposed on the first end surface S11 of the sintered body 11, and the third external electrode 20 is disposed on the second end surface S12 of the sintered body 11, and therefore, the distance between the second external electrode 16 and the third external electrode 20 can be greater than that in the multilayer varistor 1 of the first embodiment, thereby further reducing the influence on the crosstalk.

(3) Third Embodiment

A multilayer varistor 1 of a third embodiment will be described below with reference to FIGS. 8 to 10.

Figure 8:
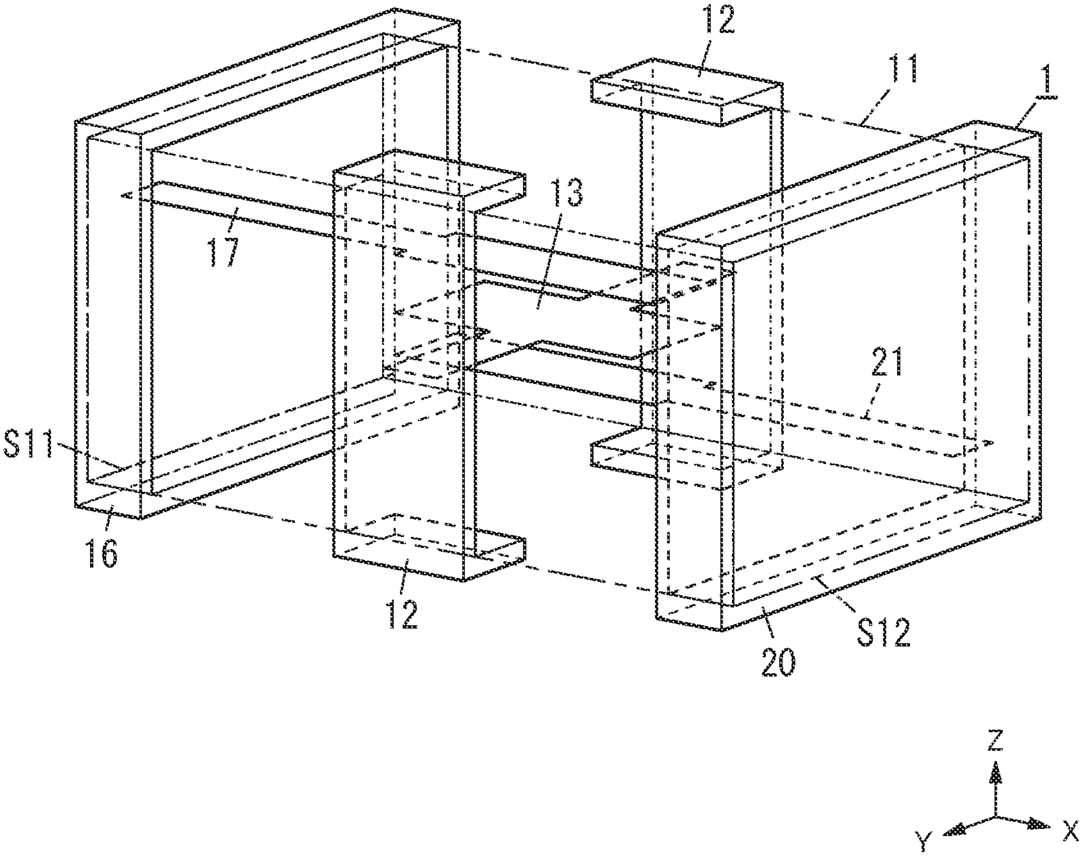
FIG. 8 is a transparent perspective view of a multilayer varistor of a third embodiment of the present disclosure.

FIG. 8 is a transparent perspective view of the multilayer varistor 1 of the third embodiment. FIG. 9 is a transparent top view of the multilayer varistor 1 of the third embodiment. FIG. 10 is a sectional view of the multilayer varistor 1 of the third embodiment.

Figure 9:
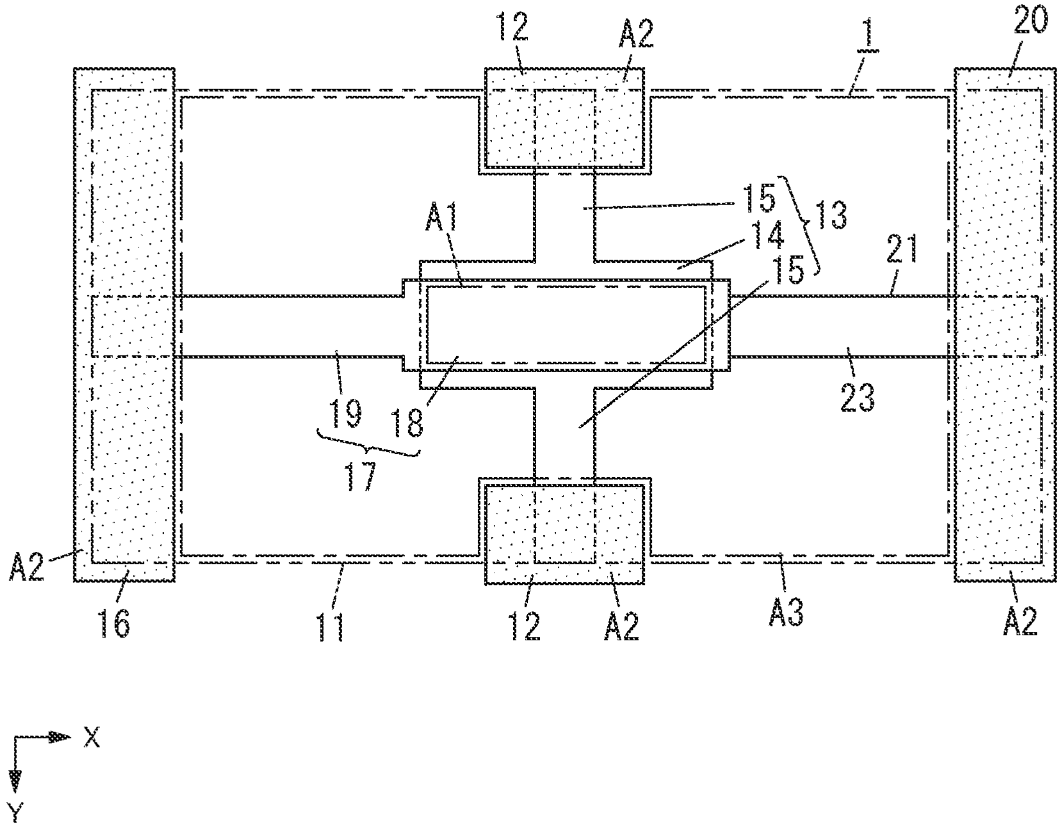
FIG. 9 is a transparent top view of the multilayer varistor of the third embodiment of the present disclosure.
Figure 10:
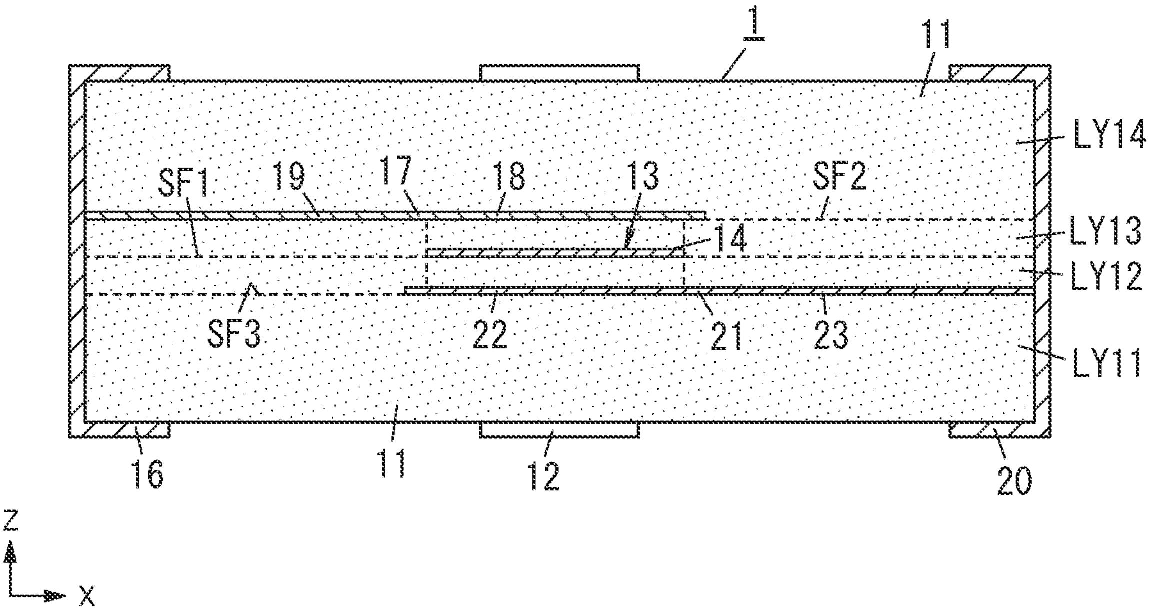
FIG. 10 is a sectional view of the multilayer varistor of the third embodiment of the present disclosure.

In the multilayer varistor 1 of the second embodiment, the first facing part 14 covers the outer perimeters of the second facing part 18 and the third facing part 22, whereas in the third embodiment, part of each of a second facing part 18 and a third facing part 22 protrude outside a first facing part 14 as shown in FIGS. 9 and 10. Note that components except for a first internal electrode 13, a second internal electrode 17, and a third internal electrode 21 have similar configurations to those in the multilayer varistor 1 of the second embodiment, and therefore, the components common to those in the second embodiment are denoted by the same reference signs, and the description thereof is omitted.

The second facing part 18 has a rectangular shape whose longitudinal direction extending in the first direction. The length of the second facing part 18 in the first direction is greater than the length of the first facing part 14 in the first direction, and the length of the second facing part 18 in the second direction is less than the length of the first facing part 14 in the second direction.

Similarly, the third facing part 22 has a rectangular shape whose longitudinal direction extending in the first direction. The length of the third facing part 22 in the first direction is greater than the length of the first facing part 14 in the first direction, and the length of the third facing part 22 in the second direction is less than the length of the first facing part 14 in the second direction.

The first facing part 14 and the second facing part 18 face each other with a prescribed distance provided therebetween, and the first facing part 14 and the third facing part 22 face each other with a prescribed distance provided therebetween. The centers of the first facing part 14, the second facing part 18, and the third facing part 22 are at the same location when viewed in the stack direction, and the second facing part 18 and the third facing part 22 substantially overlap each other when viewed in the stack direction. Moreover, when viewed in the stack direction, the second facing part 18 has a right end and a left end protruding beyond the first facing part 14 in the first direction, and the third facing part 22 has a right end and a left end protruding beyond the first facing part 14. The second facing part 18 is covered with the first facing part 14 except for the right end and the left end protruding beyond the first facing part 14. Similarly, the third facing part 22 is covered with the first facing part 14 except for the right end and the left end protruding beyond the first facing part 14.

Here, displacement of the internal electrodes caused in steps of printing the internal electrodes, stacking and cutting layers, forming the external electrodes, and the like may lead to displacement of the first internal electrode 13 in the first direction with respect to the second internal electrode 17 and the third internal electrode 21. Displacement of the first internal electrode 13 in the first direction with respect to the second internal electrode 17 and the third internal electrode 21 may lead to an increased capacity difference of electrostatic capacitance generated between each of first external electrodes 12 and a second external electrode 16 from electrostatic capacitance generated between each of the first external electrodes 12 and a third external electrode 20. In the multilayer varistor 1 of the present embodiment, the second facing part 18 and the third facing part 22 protrude on both side of the first facing part 14 in the first direction, and therefore, even when the first internal electrode 13 is displaced with respect to the second internal electrode 17 and the third internal electrode 21 in the first direction, it is possible to reduce the capacity difference of the electrostatic capacitance generated between each of first external electrodes 12 and the second external electrode 16 from the electrostatic capacitance generated between each of the first external electrodes 12 and the third external electrode 20. This provides the advantage that the crosstalk caused due to the capacity difference between a first varistor 1A and a second varistor 1B can be suppressed.

Table 1 below shows the relationship between the ratio of a longitudinal dimension (length L1) to a transverse dimension (length L2) of a superposition region A1 and the capacity difference caused due to dimensional variations. The dimensional variations are variations in dimensions between the internal electrodes or dimensions between the internal electrodes and the external electrodes caused in each of steps of printing the internal electrodes, stacking and cutting layers, forming the external electrodes, and the like. The capacity difference is the absolute value of a difference of stray capacitance generated between the first internal electrode 13 and the second internal electrode 17 from stray capacitance generated between the first internal electrode 13 and the third internal electrode 21. In Table 1, capacity differences of Examples 1, 3, and 4 and Comparative Examples 1 and 2 are evaluated, where the capacity difference of Example 2 is 1. Here, a sintered body 11 is in the shape of a rectangular parallelepiped having a length of 1.6 mm, a width of 0.8 mm, and a height of 0.8 mm, the first facing part 14 is in the shape of a rectangle having a length of 0.44 mm and a width of 0.22 mm, and the second facing part 18 and the third facing part 22 are each in the shape of a rectangle having a length of 0.54 mm and a width of 0.12 mm

TABLE 1

| | L1/L2 | Capacity Difference |
|---|---|---|
| Comparative Example 1 | 0.2 | 1.62 |
| Example 1 | 1.3 | 1.06 |
| Example 2 | 3.7 | 1.00 |
| Example 3 | 5.4 | 1.07 |
| Example 4 | 7.5 | 1.28 |
| Comparative Example 2 | 11.2 | 1.76 |

According to the results in Table 1, the ratio of the length L1 of the superposition region A1 in the first direction to the length L2 of a superposition region A1 in the second direction is preferably greater than or equal to 1.3 and less than or equal to 7.5. Reducing the difference of the electrostatic capacitance between the first varistor 1A and the second varistor 1B can improve the quality of communication.

Moreover, Table 2 below shows a relationship between the ratio of the area (area ratio) of the superposition region A1 to the area of a first stacking surface SF1 of the sintered body 11 and the capacity difference caused due to dimensional variations. The dimensional variations are, in a similar manner as described above, variations in dimensions between the internal electrodes or dimensions between the internal electrodes and the external electrodes caused in each of steps of printing the internal electrodes, stacking and cutting layers, forming the external electrodes, and the like. The capacity difference is the absolute value of the difference of the stray capacitance generated between the first internal electrode 13 and the second internal electrode 17 from the stray capacitance generated between the first internal electrode 13 and the third internal electrode 21. In Table 2, capacity differences of Examples 5 and 6 and Comparative Examples 3 and 4 are evaluated, where the capacity difference of Example 2 is 1. Here, the sintered body 11 is in the shape of a rectangular parallelepiped having a length of 1.6 mm, a width of 0.8 mm, and a height of 0.8 mm, the first facing part 14 is in the shape of a rectangle having a length of 0.44 mm and a width of 0.22 mm, and the second facing part 18 and the third facing part 22 are each in the shape of a rectangle having a length of 0.54 mm and a width of 0.12 mm

TABLE 2

| | Area Ratio | Capacity Difference |
|---|---|---|
| Comparative Example 3 | 0.020 | 0.85 |
| Example 5 | 0.024 | 0.86 |
| Example 2 | 0.040 | 1.00 |
| Example 6 | 0.161 | 1.26 |
| Comparative Example 4 | 0.391 | 1.63 |

According to the results in Table 2, the ratio of the area of the superposition region A1 to the sectional area of the sintered body 11 on the first stacking surface SF1 is preferably greater than or equal to 0.024 and less than or equal to 0.161. Reducing the difference of the electrostatic capacitance between the first varistor 1A and the second varistor 1B can improve the quality of communication.

Note that in the multilayer varistor 1 of the third embodiment, in a similar manner to the multilayer varistor 1 of each of the first and second embodiments, the first internal electrode 13 has the superposition region A1 overlapping the second internal electrode 17 and the third internal electrode 21 in the third direction. Here, on the first stacking surface SF1, the superposition region A1 is in a second region A3 except for a first region A2 on which each of the first external electrodes 12, the second external electrode 16, and the third external electrode 20 is projected. This reduces stray capacitance generated be each of the first external electrodes 12 and the second external electrode 16, and stray capacitance generated between each of the first external electrodes 12 and the third external electrode 20, thereby suppressing the crosstalk. Note that the multilayer varistor 1 of each of the first and second embodiments includes, on the first stacking surface SF1, a superposition region A1 in a second region A3 except for a first region A2 on which each of the first external electrodes 12, the second external electrode(s) 16, and the third external electrode(s) 20 is projected, thereby suppressing the cross talk.

Note that the first internal electrode 13, the second internal electrode 17, and the third internal electrode 21 of the third embodiment may be applied to the multilayer varistor 1 of the first embodiment, thereby providing similar advantages to those provided by the multilayer varistor 1 of the third embodiment.

(4) Variations

Variations of the multilayer varistor of the present disclosure will be described below.

Figure 11:
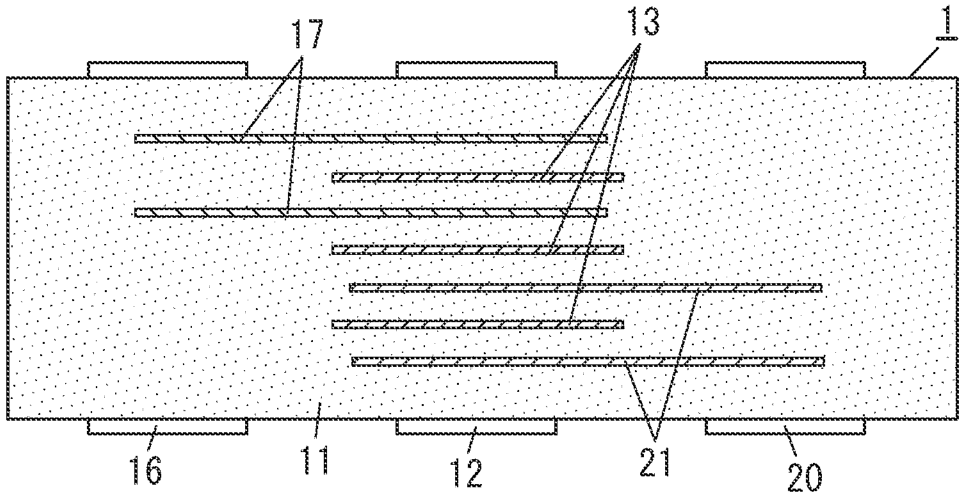
FIG. 11 is a sectional view of a multilayer varistor of a variation of the present disclosure.

The multilayer varistor 1 in FIG. 1 includes one layer including the second internal electrode 17 and the first internal electrode 13 facing each other and one layer including the third internal electrode 21 and the first internal electrode 13 facing each other. Alternatively, however, a plurality of layers each including the second internal electrode 17 and the first internal electrode 13 facing each other and a plurality of layers each including the third internal electrode 21 and the first internal electrode 13 facing each other may be provided as shown in FIG. 11. In this case, these layers are preferably vertically separated such that the plurality of layers each including the second internal electrode 17 and the first internal electrode 13 are disposed, for example, on an upper surface side and the plurality of layers each including the third internal electrode 21 and the first internal electrode 13 are disposed, for example, on a lower surface side as shown in FIG. 11. This configuration can further suppress the crosstalk. Moreover, increasing a facing area of the second internal electrodes 17 and the first internal electrodes 13 and a facing area of the third internal electrodes 21 and the first internal electrodes 13 can improve the performance as the varistor.

Note that in the multilayer varistor 1 of each of the second and third embodiments, a plurality of second internal electrodes 17 and a plurality of first internal electrodes 13 may face each other, and/or a plurality of third internal electrodes 21 and a plurality of first internal electrodes 13 may face each other.

Moreover, in the multilayer varistor 1 of the first embodiment, the first external electrodes 12, the second external electrodes 16, and the third external electrodes 20 are disposed on both the first side surface S21 and the second side surface S22, but the first external electrode 12, the second external electrode 16, and the third external electrode 20 may be disposed on at least one of the first side surface S21 or the second side surface S22. That is, the first external electrode 12, the second external electrode 16, and the third external electrode 20 may be disposed on only the first side surface S21 or the second side surface S22.

Moreover, in the embodiments described above, the four layers LY11 to LY14 are stacked on one another, thereby forming the sintered body 11, but the sintered body 11 is not limited to having a stack structure including four layers. The sintered body 11 at least has a stack structure including a plurality of layers.

The multilayer varistor 1 according to the present disclosure has reduced stray capacitance generated between the external electrodes and thus has suppressed crosstalk, and thus, this multilayer varistor 1 is industrially useful.

REFERENCE SIGNS LIST

1 Multilayer Varistor
1A First Varistor
1B Second Varistor
11 Sintered Body
12 First External Electrode
13 First Internal Electrode
14 First Facing Part
15 First Lead-Out Part
16 Second External Electrode
17 Second Internal Electrode
18 Second Facing Part
19 Second Lead-Out Part
19A First Projection
19B First Connection Part
20 Third External Electrode
21 Third Internal Electrode
22 Third Facing Part
23 Third Lead-Out Part
23A Second Projection
23B Second Coupler
A1 Superposition Region
A2 First Region
A3 Second Region
LY11 to LY14 Layer
S11 First End Surface
S12 Second End Surface
S21 First Side Surface
S22 Second Side Surface
S31 First Principal Surface
S32 Second Principal Surface
SF1 First Stacking Surface
SF2 Second Stacking Surface
SF3 Third Stacking Surface

The invention claimed is:

1. A multilayer varistor comprising:
a sintered body;
a first internal electrode;
a second internal electrode;
a third internal electrode;
a first external electrode;
a second external electrode; and
a third external electrode,
the sintered body
having a first end surface and a second end surface facing each other in a first direction, a first side surface and a second side surface facing each other in a second direction, and a first principal surface and a second principal surface facing each other in a third direction,
having a stack structure including a plurality of layers stacked on each other in the third direction, and
being in a shape of a rectangular parallelepiped having long sides extending in the first direction,
the first internal electrode being disposed on a first stacking surface in an interior of the sintered body,
the second internal electrode being disposed on a second stacking surface in the interior of the sintered body, the second stacking surface being different from the first stacking surface,
the third internal electrode being disposed on a third stacking surface in the interior of the sintered body, the third stacking surface being different from the first stacking surface and the second stacking surface,
the first external electrode being electrically connected to the first internal electrode;
the second external electrode being electrically connected to the second internal electrode;
the third external electrode being electrically connected to the third internal electrode, the first internal electrode including a first facing part and a first lead-out part, a width of the first lead-out part being less than a width of the first facing part, the second internal electrode including a second facing part and a second lead-out part, a width of the second lead-out part being less than a width of the second facing part, the third internal electrode including a third facing part and a third lead-out part, a width of the third lead-out part being less than a width of the third facing part, the first internal electrode being disposed between the second internal electrode and the third internal electrode, and in the first direction, a length of the first facing part being greater than a length of the second facing part and being greater than a length of the third facing part.

2. The multilayer varistor of claim 1, wherein in the first direction, a length of the first facing part is greater than or equal to 107.5% and less than or equal to 115% of a length of the second facing part or the third facing part.

3. The multilayer varistor of claim 1, wherein in the second direction, a length of the first facing part is greater than or equal to 107.5% and less than or equal to 115% of a length of the second facing part or the third facing part.

4. The multilayer varistor of claim 1, wherein in the first direction, the width of the first lead-out part is less than or equal to 90% of the width of the first facing part.

5. A multilayer varistor comprising:

a sintered body;

a first internal electrode;

a second internal electrode;

a third internal electrode;

a first external electrode;

a second external electrode; and a third external electrode, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the first external electrode being electrically connected to the first internal electrode, the second external electrode being electrically connected to the second internal electrode, the third external electrode being electrically connected to the third internal electrode, the first internal electrode including a first facing part and a first lead-out part, a width of the first lead-out part being less than a width of the first facing part, the second internal electrode including a second facing part and a second lead-out part, a width of the second lead-out part being less than a width of the second facing part, the third internal electrode including a third facing part and a third lead-out part, a width of the third lead-out part being less than a width of the third facing part, the first internal electrode being disposed between the second internal electrode and the third internal electrode, and in the second direction, a length of the first facing part being greater than a length of the second facing part and being greater than a length of the third facing part.

6. A multilayer varistor comprising:

a sintered body;

a first internal electrode;

a second internal electrode;

a third internal electrode;

a first external electrode;

a second external electrode; and a third external electrode, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the first external electrode being electrically connected to the first internal electrode, the second external electrode being electrically connected to the second internal electrode, the third external electrode being electrically connected to the third internal electrode, the first internal electrode including a first facing part and a first lead-out part, a width of the first lead-out part being less than a width of the first facing part, the second internal electrode including a second facing part and a second lead-out part, a width of the second lead-out part being less than a width of the second facing part, the third internal electrode including a third facing part and a third lead-out part, a width of the third lead-out part being less than a width of the third facing part, the first internal electrode being disposed between the second internal electrode and the third internal electrode, and the first facing part having an area greater than an area of the second facing part and greater than an area of the third facing part.

7. A multilayer varistor comprising:
a sintered body;
a first internal electrode;
a second internal electrode;
a third internal electrode;
a first external electrode;
a second external electrode; and
a third external electrode,
the sintered body:
having a first end surface and a second end surface facing each other in a first direction, a first side surface and a second side surface facing each other in a second direction, and a first principal surface and a second principal surface facing each other in a third direction,
having a stack structure including a plurality of layers stacked on each other in the third direction, and
being in a shape of a rectangular parallelepiped having long sides extending in the first direction,
the first internal electrode being disposed on a first stacking surface in an interior of the sintered body,
the second internal electrode being disposed on a second stacking surface in the interior of the sintered body, the second stacking surface being different from the first stacking surface,
the third internal electrode being disposed on a third stacking surface in the interior of the sintered body, the third stacking surface being different from the first stacking surface and the second stacking surface,
the first external electrode being electrically connected to the first internal electrode,
the second external electrode being electrically connected to the second internal electrode,
the third external electrode being electrically connected to the third internal electrode,
the first internal electrode including a first facing part and a first lead-out part, a width of the first lead-out part being less than a width of the first facing part,
the second internal electrode including a second facing part and a second lead-out part, a width of the second lead-out part being less than a width of the second facing part,
the third internal electrode including a third facing part and a third lead-out part, a width of the third lead-out part being less than a width of the third facing part,
the first internal electrode being disposed between the second internal electrode and the third internal electrode,
in the second direction, the width of the second lead-out part being less than or equal to 90% of the width of the second facing part, and
in the second direction, the width of the third lead-out part being less than or equal to 90% of the width of the third facing part.

8. A multilayer varistor comprising:
a sintered body;
a first internal electrode;
a second internal electrode;
a third internal electrode;
a first external electrode;
a second external electrode; and
a third external electrode,
the sintered body:
having a first end surface and a second end surface facing each other in a first direction, a first side surface and a second side surface facing each other in a second direction, and a first principal surface and a second principal surface facing each other in a third direction,
having a stack structure including a plurality of layers stacked on each other in the third direction, and
being in a shape of a rectangular parallelepiped having long sides extending in the first direction,
the first internal electrode being disposed on a first stacking surface in an interior of the sintered body,
the second internal electrode being disposed on a second stacking surface in the interior of the sintered body, the second stacking surface being different from the first stacking surface,
the third internal electrode being disposed on a third stacking surface in the interior of the sintered body, the third stacking surface being different from the first stacking surface and the second stacking surface,
the first external electrode being electrically connected to the first internal electrode,
the second external electrode being electrically connected to the second internal electrode,
the third external electrode being electrically connected to the third internal electrode,
the second internal electrode including a second facing part and a second lead-out part, a width of the second lead-out part being less than a width of the second facing part,
the third internal electrode including a third facing part and a third lead-out part, a width of the third lead-out part being less than a width of the third facing part,
the second facing part and the third facing part facing each other,
the first internal electrode being disposed between the second facing part and the third facing part,
the multilayer varistor including:
a first varistor between the first external electrode and the second external electrode and
a second varistor between the first external electrode and the third external electrode,
a difference between the electrostatic capacitance of the first varistor and the electrostatic capacitance of the second varistor being greater than or equal to −20% and less than or equal to +20% of the electrostatic capacitance of the first varistor.

9. A multilayer varistor comprising:
a sintered body;
a first internal electrode;
a second internal electrode;
a third internal electrode;
a first external electrode;
a second external electrode; and
a third external electrode,
the sintered body
having a first end surface and a second end surface facing each other in a first direction, a first side surface and a second side surface facing each other in a second direction, and a first principal surface and a second principal surface facing each other in a third direction,
having a stack structure including a plurality of layers stacked on each other in the third direction, and
being in a shape of a rectangular parallelepiped having long sides extending in the first direction,
the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the first external electrode being electrically connected to the first internal electrode, the second external electrode being electrically connected to the second internal electrode, the third external electrode being electrically connected to the third internal electrode, the first internal electrode having a superposition region superposed on the second internal electrode and the third internal electrode in the third direction, a length of the superposition region in the first direction being greater than a length of the superposition region in the second direction, and a ratio of the length of the superposition region in the first direction to the length of the superposition region in the second direction being greater than or equal to 1.3 and less than or equal to 7.5.

10. A multilayer varistor comprising:

a sintered body;

a first internal electrode;

a second internal electrode;

a third internal electrode;

a first external electrode;

a second external electrode; and a third external electrode, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the first external electrode being electrically connected to the first internal electrode, the second external electrode being electrically connected to the second internal electrode, the third external electrode being electrically connected to the third internal electrode, the first internal electrode having a superposition region superposed on the second internal electrode and the third internal electrode in the third direction, a length of the superposition region in the first direction being greater than a length of the superposition region in the second direction, and a ratio of an area of the superposition region to a sectional area of the sintered body on the first stacking surface being greater than or equal to 0.024 and less than or equal to 0.161.

11. A multilayer varistor comprising:

a sintered body;

a first internal electrode;

a second internal electrode;

a third internal electrode;

a plurality of first external electrodes;

a second external electrode; and a third external electrode, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the plurality of first external electrodes being electrically connected to the first internal electrode, the second external electrode being electrically connected to the second internal electrode, the third external electrode being electrically connected to the third internal electrode, the plurality of first external electrodes being disposed on part of the first side surface and part of the second side surface, the second external electrode being disposed on at least part of the first end surface, the third external electrode being disposed on at least part of the second end surface, the first internal electrode having a superposition region superposed on the second internal electrode and the third internal electrode in the third direction, a length of the superposition region in the first direction being greater than a length of the superposition region in the second direction, and on the first stacking surface, the superposition region being in a second region except for a first region on which each of the first external electrodes, the second external electrode, and the third external electrode is projected.

12. A multilayer varistor comprising:

a sintered body;

a first internal electrode;

a second internal electrode;

a third internal electrode;

at least one first external electrode;

at least one second external electrode; and at least one third external electrode, the sintered body having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the at least one first external electrode being disposed on at least one of the first side surface or the second side surface and being electrically connected to the first internal electrode, the at least one second external electrode being disposed on at least one of the first side surface or the second side surface and being electrically connected to the second internal electrode, the at least one third external electrode being disposed on at least one of the first side surface or the second side surface and being electrically connected to the third internal electrode, the first internal electrode having a superposition region superposed on the second internal electrode and the third internal electrode in the third direction, the at least one first external electrode being disposed between the at least one second external electrode and the at least one third external electrode in the first direction, the multilayer varistor including:

a first varistor between the first external electrode and the second external electrode and a second varistor between the first external electrode and the third external electrode, a difference between the electrostatic capacitance of the first varistor and the electrostatic capacitance of the second varistor being greater than or equal to −20% and less than or equal to +20% of the electrostatic capacitance of the first varistor.

13. The multilayer varistor of claim 12, wherein the first internal electrode, the second internal electrode, and the third internal electrode are each disposed along the second direction.

14. The multilayer varistor of claim 12, wherein the at least one first external electrode includes two first external electrodes electrically connected to each other via the first internal electrode, one of the two first external electrodes is disposed on the first side surface, and the other of the two first external electrodes is dispose on the second side surface, the at least one second external electrode includes two second external electrodes electrically connected to each other via the second internal electrode, one of the two second external electrodes is disposed on the first side surface, and the other of the two second external electrodes is disposed on the second side surface, the at least one third external electrode includes two third external electrodes electrically connected to each other via the third internal electrode, one of the two third external electrodes is disposed on the first side surface, and the other of the two third external electrodes is disposed on the second side surface.

15. A multilayer varistor comprising:

a sintered body;

a first internal electrode;

a second internal electrode;

a third internal electrode;

two first external electrodes;

two second external electrodes; and two third external electrodes, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, one of the two first external electrodes being disposed on the first side surface, and the other of the two first external electrodes being dispose on the second side surface, the two first external electrodes being electrically connected to the first internal electrode respectively, one of the two second external electrodes being disposed on the first side surface, and the other of the two second external electrodes being disposed on the second side surface, the two second external electrodes being electrically connected to the second internal electrode respectively, one of the two third external electrodes being disposed on the first side surface, and the other of the two third external electrodes being disposed on the second side surface, the two third external electrodes being electrically connected to the third internal electrode respectively, the first internal electrode having a superposition region superposed on the second internal electrode and the third internal electrode in the third direction, in the first direction, the two first external electrodes being disposed between the two second external electrodes and the two third external electrodes, the second internal electrode including a second facing part and a second lead-out part, the second lead-out part including:

a first connection part connecting the two second external electrodes to each other and a first projection protruding from the second facing part along the first direction and connected to the first connection part, the third internal electrode including a third facing part and a third lead-out part, the third lead-out part including:

a second connection part connecting the two third external electrodes to each other and a second projection protruding from the third facing part along the first direction and connected to the second connection part.

16. A multilayer varistor comprising:

a sintered body;

a first internal electrode;

a second internal electrode;

a third internal electrode;

a first external electrode;

a second external electrode; and a third external electrode, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the first external electrode being electrically connected to the first internal electrode, the second external electrode being electrically connected to the second internal electrode, the third external electrode being electrically connected to the third internal electrode, the first internal electrode including a first facing part and a first lead-out part, a width of the first lead-out part being less than a width of the first facing part, the first internal electrode being disposed between the second internal electrode and the third internal electrode, the multilayer varistor including:

a first varistor between the first external electrode and the second external electrode and a second varistor between the first external electrode and the third external electrode, each of the first varistor and the second varistor having an electrostatic capacitance of less than or equal to 200 pF, a difference between the electrostatic capacitance of the first varistor and the electrostatic capacitance of the second varistor being greater than or equal to −20% and less than or equal to +20% of the electrostatic capacitance of the first varistor.

17. A multilayer varistor comprising:

a sintered body;

a first internal electrode;

a second internal electrode;

a third internal electrode;

a first external electrode;

a second external electrode; and a third external electrode, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first internal electrode being disposed on a first stacking surface in an interior of the sintered body, the second internal electrode being disposed on a second stacking surface in the interior of the sintered body, the second stacking surface being different from the first stacking surface, the third internal electrode being disposed on a third stacking surface in the interior of the sintered body, the third stacking surface being different from the first stacking surface and the second stacking surface, the first external electrode being electrically connected to the first internal electrode, the second external electrode being electrically connected to the second internal electrode, the third external electrode being electrically connected to the third internal electrode, the first internal electrode having a superposition region superposed on the second internal electrode and the third internal electrode in the third direction, a length of the superposition region in the first direction being greater than a length of the superposition region in the second direction, the multilayer varistor including:

a first varistor between the first external electrode and the second external electrode and a second varistor between the first external electrode and the third external electrode, each of the first varistor and the second varistor including an electrostatic capacitance of less than or equal to 200 pF, a difference between the electrostatic capacitance of the first varistor and the electrostatic capacitance of the second varistor being greater than or equal to −20% and less than or equal to +20% of the electrostatic capacitance of the first varistor.

18. A multilayer varistor comprising:

a sintered body;

a first internal electrode;

a second internal electrode;

a third internal electrode;

a first external electrode;

a second external electrode; and a third external electrode, the sintered body:

having a first end surface and a second end surface facing each other in a first direction, a first side surface and a second side surface facing each other in a second direction, and a first principal surface and a second principal surface facing each other in a third direction, having a stack structure including a plurality of layers stacked on each other in the third direction, and being in a shape of a rectangular parallelepiped having long sides extending in the first direction, the first external electrode being electrically connected to the first internal electrode, the second external electrode being electrically connected to the second internal electrode, the third external electrode being electrically connected to the third internal electrode, the multilayer varistor including:

a first varistor between the first external electrode and the second external electrode and a second varistor between the first external electrode and the third external electrode, a difference between the electrostatic capacitance of the first varistor and the electrostatic capacitance of the second varistor being greater than or equal to −20% and less than or equal to +20% of the electrostatic capacitance of the first varistor.

19. The multilayer varistor of claim 18, wherein the first internal electrode has a superposition region superposed on the second internal electrode and the third internal electrode in the third direction.

20. The multilayer varistor of claim 18, wherein each of the first varistor and the second varistor has an electrostatic capacitance of less than or equal to 200 pF.

* * * * *